United States Patent
Tisue

(10) Patent No.: US 6,775,306 B2
(45) Date of Patent: Aug. 10, 2004

(54) DIRECTLY PIVOTABLE GRATING FOR AGILE LASER TUNERS

(76) Inventor: J. Gilbert Tisue, 1329 Santa Cruz Dr., Minden, NV (US) 89423

( * ) Notice: Subject to any disclaimer, the term of this patent is extended or adjusted under 35 U.S.C. 154(b) by 147 days.

(21) Appl. No.: 10/261,718

(22) Filed: Sep. 30, 2002

(65) Prior Publication Data

US 2004/0066829 A1 Apr. 8, 2004

(51) Int. Cl.[7] ............................. H01S 3/10; H01S 3/08
(52) U.S. Cl. ........................................ 372/20; 372/102
(58) Field of Search ............................ 372/20, 14, 32, 372/34, 102; 359/572

(56) References Cited

U.S. PATENT DOCUMENTS

| | | | | |
|---|---|---|---|---|
| 4,815,820 A | * | 3/1989 | McNeil et al. ............. | 359/572 |
| 5,331,651 A | * | 7/1994 | Becker et al. ............. | 372/32 |
| 6,025,939 A | * | 2/2000 | Lowenhar et al. ......... | 359/34 |
| 6,134,253 A | * | 10/2000 | Munks et al. ............. | 372/32 |
| 6,493,365 B1 | * | 12/2002 | Wu et al. .................. | 372/20 |

* cited by examiner

*Primary Examiner*—Quyen Leung
*Assistant Examiner*—Hung T Vy

(57) ABSTRACT

Apparatus and method of providing an easily aligned directly pivotable grating suitable for high power agile wavelength laser tuners. A mounting and adjustment plane (26) is located on a rotational axis (28) and on a grating (27). An external adjustment mechanism and thermal bonding (40) reduce rotational moment and enable high power applications. The implementation is capable of utilizing grating blank materials that resist tapping or drilling. Low cost is achieved by construction in a matrix of ruling blanks (52) thereby complimenting the characteristics of ruling engines.

20 Claims, 5 Drawing Sheets

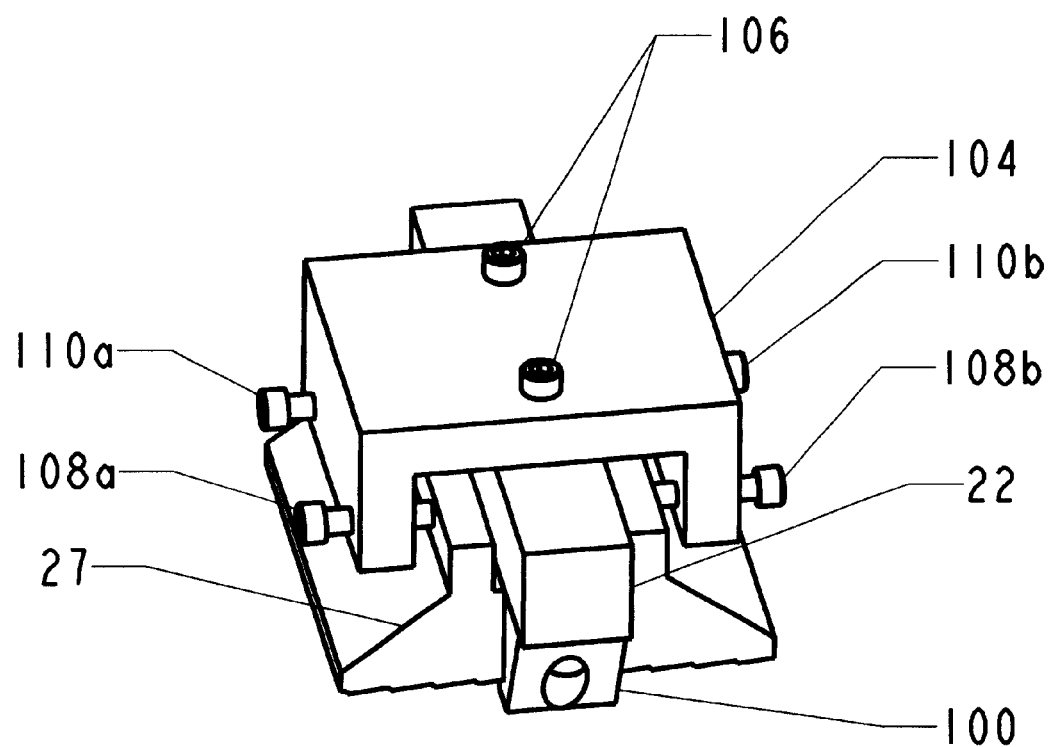
FIG 4
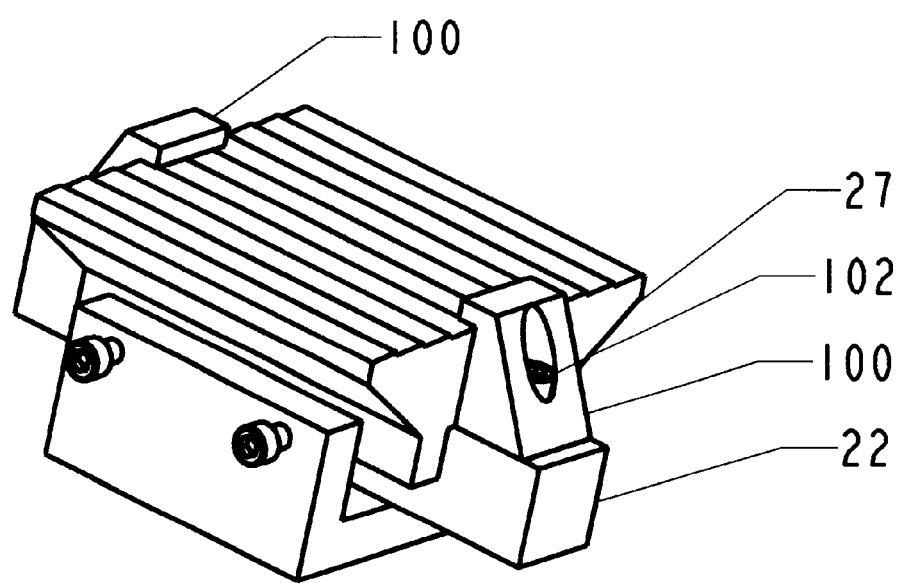

DIRECTLY PIVOTABLE GRATING FOR AGILE LASER TUNERS

BACKGROUND OF INVENTION

1. Field of Invention

This invention relates to tunable laser systems and in particular to high power and highly agile directly driven grating tuned devices.

2. Prior Art

Laser radar (LIDAR) systems, utilizing tunable lasers, can be used to transmit different wavelengths of light into airborne suspensions (such as smog or poison gasses) which have differing reflectance's or absorption to different wavelengths. The reflected light intensity is then measured for remote spectrographic analysis of suspension samples. It is advantageous to maximize the stability and repeatability of the output at each different wavelength. It is also advantageous to minimize intervals between transmitting wavelengths in order to reduce measurement interference by relative motion between the LIDAR unit, the intervening atmosphere and the suspension sample. Maximum accuracy is achieved by successively transmitting different wavelengths with constant power at the laser's maximum cyclic rate.

Tunable lasers typically include an intra-cavity diffraction grating. The wavelength of such lasers is tuned by adjusting the angle of incidence of the laser cavity beam against the diffraction grating. Such intra-cavity tuning requires very high accuracy and stability. Tuned $CO_2$ lasers, for instance, require a grating angular range of typically 0.2 radians and an accuracy of 10 or 20 $\mu$radians. Output laser power is a sensitive function of the tuning angle near a particular wavelength.

Laser tuners utilizing gratings typically have a tuning axis and a non-tuning axis. Tuning is accomplished either by rotating a grating about the tuning axis directly in the path of the beam or by rotating a mirror against a fixed grating. The subject of this invention and disclosure is the case where the tuning element is a grating directly mounted on a rotational shaft. For proper tuning, the beam or cavity being tuned must strike the grating with the same accuracy in both the tuning and non-tuning directions or axes. The stability and accuracy of the tuning axis positioning is determined by the corresponding accuracy of the device or system rotating the tuning element about the tuning axis and is not a subject of this disclosure.

As the tuning element is rotated about the tuning axis, the beam must maintain perpendicularity with the grating lines. Any departure from said perpendicularity represents motion about the non-tuning axis and therefore an error in tuning. A grating behaves about the non-tuning axis as a simple mirror. No errors will occur if the grating rotational axis, including bearing or flexure translations, run outs and tilts, is parallel to the grating lines. With practical and economical machining, significant and typically excessive errors in the non-tuning axis will occur.

In the prior art, a number of approaches to correct this error have been used with varying degrees of success. At very low speeds, straightforward dual axis adjustment schemes are effective. These methods use fine threads, balls and grooves to iteratively adjust the rotational axis to the grating line parallel. For these techniques, alignment is a time consuming process and attempts to increase tuning rate are hampered by excessive moment of inertia, difficult balance, drive complexities, vibration injection, backlash and general lack of robustness.

McNeil et al in U.S. Pat. No. 4,815,820 proposes a one-axis adjustment scheme. While only one adjustment on the rotating mechanism is required, the approach as disclosed is still mechanically large and complex. The alignment process is improved but is still an iterative one. While the scheme is more agile, its response time is measured in seconds rather than milliseconds and it suffers the same difficulties noted above when increasing tuning rate.

Other, more efficient dual axis approaches, use simpler and therefore usually lighter configurations with bending types of adjustment. Tuning rate, balance and robustness are enhanced significantly. Contrary to the assertion in the referenced patent that dual adjustment schemes are iterative and require knowledge of the value of the two components of error, non-iterative dual axis adjustment schemes can be configured. Agreeably, the hardware for two adjustments oh the rotating axis is undesirable.

The above schemes must deal with the tradeoff between stiffness for stability and the loss of adjustment control due to static friction. All perform poorly when trying to adjust with robustness on a rotational axis down to angles of a few $\mu$radians. Further, material incompatibilities, thermal conductivities, thermal expansion coefficients and other issues related to the tuning of high speed and high power lasers place difficult requirements on grating blank material. Grating blanks of ceramic like or crystalline structure may in some cases be preferable or required. These materials do not always machine well and, in some cases, may not be tapped or drilled. This often prevents the integration of the mechanical adjustment with the grating, thereby increasing complexity.

There is therefore a critical need, heretofore unsatisfied, for a structure and, alignment methodology for producing a simple, low moment, balanced and easily aligned rotary grating with both mechanical and thermal robustness.

SUMMARY OF INVENTION

Preferred embodiments of a directly pivotable grating for agile laser tuners according to the present invention preferably include a rotary shaft supported by bearings or flexures with a machined adjustment flat or plane, a mounting means for receiving a removable grating adjuster, a grating blank with ruled grating lines on a front face and an adjustment plane on a back face for receiving the shaft at its adjustment plane and a bonding means for attaching the grating to the shaft. The grating is preferably fabricated as one in a matrix of gratings and maintains a constant optical and mounting cross-section for efficient machining and ruling. Virtually any grating blank material can be used that is compatible with the lasers optical, thermal, mechanical and dissimilar materials requirements. A one-axis adjustment mechanism preloads the grating onto the shaft's adjustment plane and performs the alignment under the most favorable condition of low friction before bonding and removal. Filled bonding materials with high thermal conductivities and high shear modulus are available with suitable pre-cure times for alignment. The resulting assembly has high stiffness and, depending on the blank material itself, low thermal gradients even in very high power applications. Because of the inherent simple nature of the components, from a machining point of view, very little movement during adjustment is required meaning that in most cases balance-by-design is adequate.

OBJECTS AND ADVANTAGES

It is a primary objective of the present invention to provide a simple low moment rotary grating suitable for wavelength tuning of high power agile lasers.

It is another objective to enable the use of lightweight grating blank materials, which cannot be drilled or tapped.

It is another objective to simplify grating blank machining and ruling operations.

It is another objective to improve thermal conductivity, reduce thermal drops and increase laser power capability.

It is another objective to eliminate the grating adjustment mechanism from the rotary assembly.

It is another objective to enable simplified grating alignment under low friction conditions while providing a robust final grating assembly.

It is another objective to enable the use of a wider range of materials for optical elements in a wavelength tuner.

The foregoing and other object features and advantages will become more apparent from a reading of the following description of the preferred embodiments as shown in connection with the accompanying drawings.

BRIEF DESCRIPTION OF DRAWINGS

In the drawing:

FIG. 4 is a diagram of an apparatus suitable for the alignment of the preferred embodiment;

DETAILED DESCRIPTION

Description of a Preferred Embodiment

Figure 1:
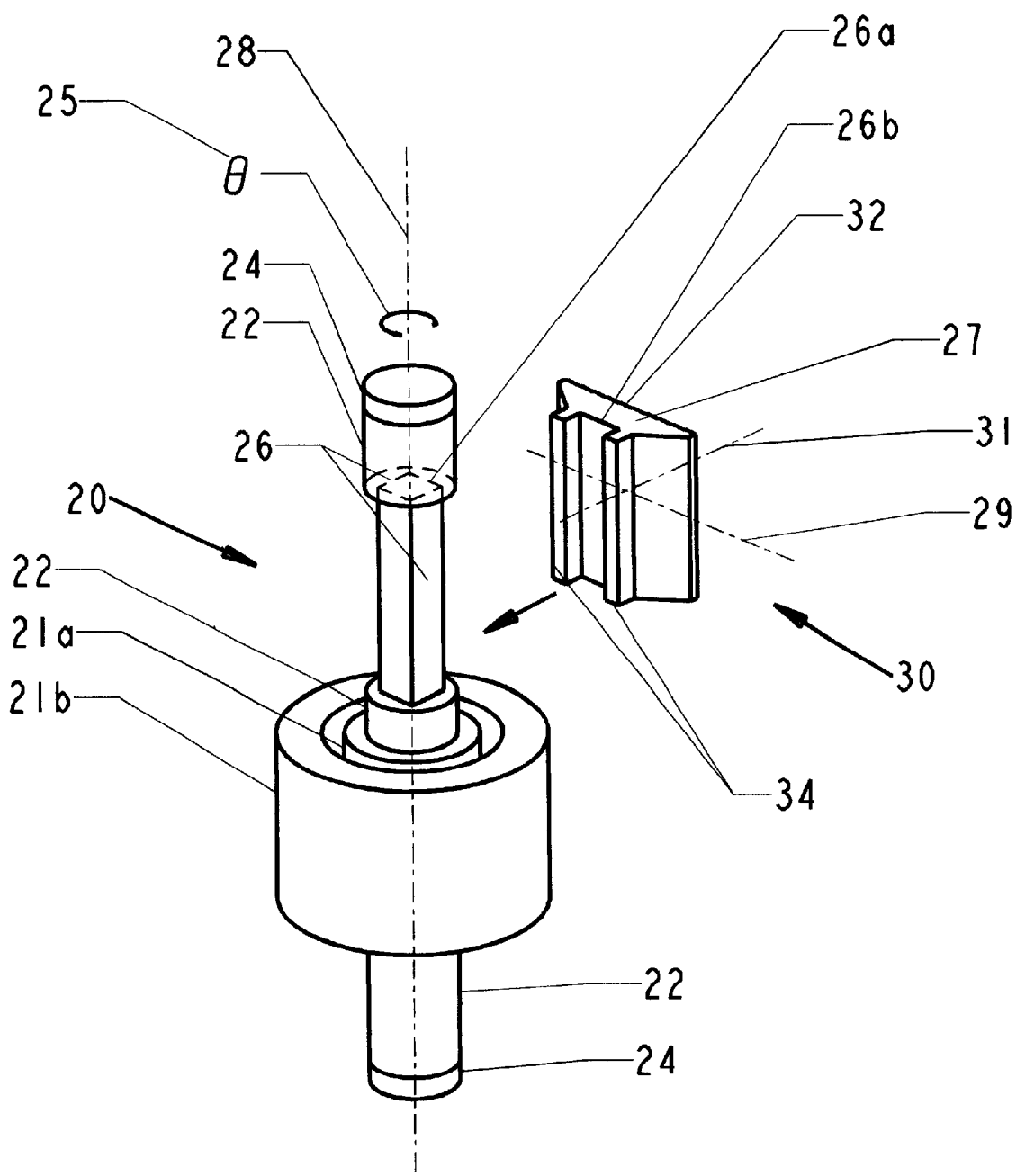
FIG. 1 is a diagram of a preferred embodiment of the present invention showing separated rotor and grating with adjustment planes at a zero degree angle.
Figure 2A:
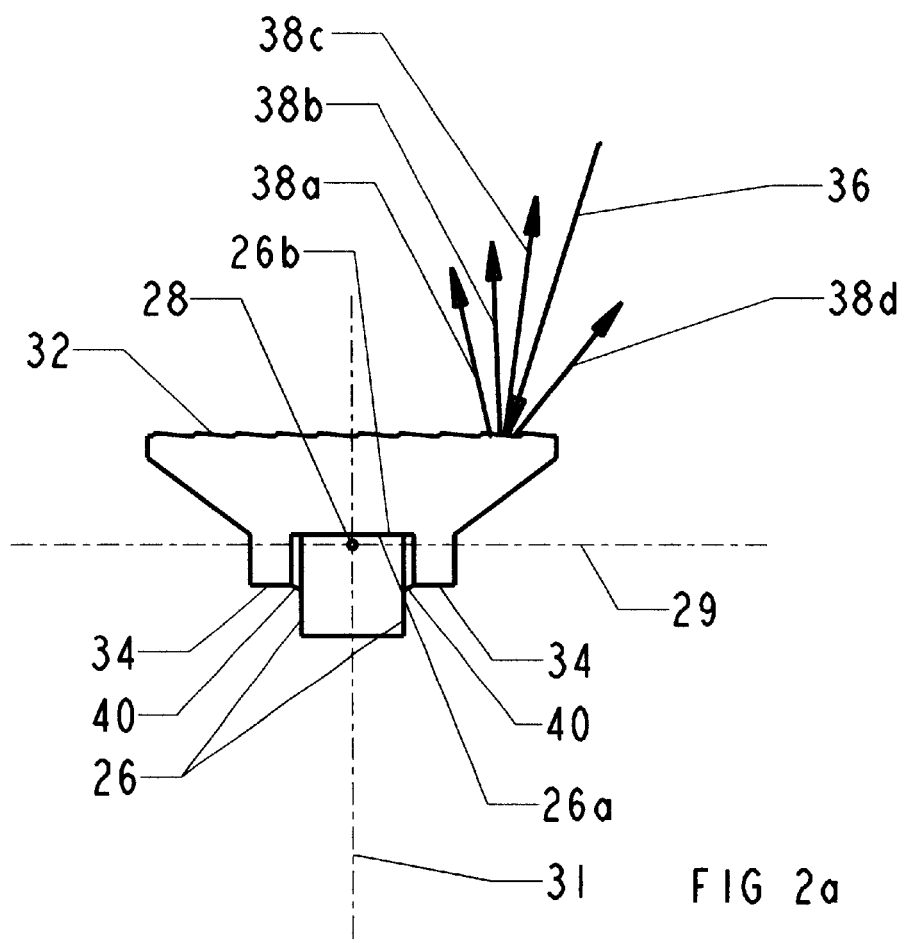
FIG. 2a is a diagram of a cross-section of the rotor and grating of the preferred embodiment with the components in contact.

Referring to FIG. 1 and FIG. 2a, a directly pivotable grating according to the present invention in a preferred embodiment includes a rotor means 20, a grating means 30 and a bonding means 40.

Rotor means 20 is preferably the rotor of a galvanometric actuator including a shaft 22, an actuator rotor 21a, one or a plurality of pivots 24 defining an equivalent rotational or tuning axis 28, a rotor adjustment plane 26a substantially parallel to the rotational axis 28 and preferably one or a plurality of bonding planes 26. Pivots 24 are preferably rotational flexures but could be bearings, bushings or other types of rotation controlling members. Said pivots are preferably located outboard of the adjustment plane and the actuator rotor as shown in FIG. 1, but may lie in any functional combination, outboard or between said plane and actuator rotor. Actuator stator 21b and actuator rotor 21a are magnetically coupled and comprise an actuator means to control and rotate said rotor means to stop at positions significant to the tuning function. Said actuator means, within the scope of this invention, could also be a separate and external actuator mechanically coupled to said rotor means.

Grating means 30 comprises an optical surface 32, an oppositely positioned grating adjustment plane 26b at a predetermined angle relative to the surface 32 and preferably one or a plurality of thermal ridges, said optical surface being a ruled grating. Optical surface 32 and adjustment plane 26b comprise grating 27. Grating adjustment plane 26b is configured to contact the rotor adjustment plane 26a of rotor means 20 for rotational adjustment of the ruled lines of grating means 30 relative to tuning axis 28. Grating means 30 preferably also includes one or a plurality of thermal ridges 34. Said thermal ridges 34 being arranged a predetermined spacing from said bonding planes 26 to allow for the rotational alignment of said ruled lines of grating means 30 about a perpendicular to the adjustment planes 26a and 26b.

Bonding means 40 is shown in FIG. 2a, a cross-section through grating means 30 and rotor means 20. Bonding means 40 comprises a thermal and mechanical connection between rotor adjustment plane 26a and grating adjustment plane 26b and between bonding planes 26 and thermal ridges 34.

In operation, pivots 24 are attached to a housing and constrain the movement of rotor means 20 and grating means 30 to rotation about the tuning axis 28. Rotation angle θ25 of rotor 20 is responsive to magnetic coupling from actuator stator 21b in turn controlled by a positioning system not a part of this invention or disclosure. Arbitrarily, for this disclosure, the angle θ will be regarded as having the same zero reference as the incidence angle of an input beam 36 to the plane of the grating. Grating means 30, after adjustment, is bonded to adjusting plane 26a and bonding planes 26, said planes being integral parts of rotor means 20. The grating optical surface thus rotates in unison with rotor tuning angle θ25. The input beam 36, typically a laser or the cavity beam of a tuned laser, impinges the grating optical surface 32 as shown in FIG. 2a, a cross-section of the rotor and grating. A resulting plurality of output beams, in the tuning direction about the tuning axis 28, is typically represented by beams 38a to 38d. Responsive to the angle θ25 of said input beam 36, the wavelength λ of the beam and a grating ruled line spacing d, the angles, α, of said plurality of output beams is:

$$\alpha = \sin^{-1}(n\lambda/d - \sin\theta)$$

where n is the grating reflection order and is a positive number or zero. This equation is typically applicable for alignment of the grating and rotor or other functions where the wavelength of the beam is predetermined.

In the typical laser tuning application, the input θ and output α beam angles are equal to each other and to the angle of the cavity. This equation then reduces to the Littrow reflection equation:

$$\theta = \sin^{-1}(n\lambda/2d)$$

where θ is the input and output beam angle.

In a non-tuning direction about axis 29 in FIG. 2a, the grating has no periodic nature and operates as a simple mirror. Therefore, for the tuning of lasers where the accuracy in the non-tuning direction is as important as that in the tuning direction, the perpendicularity of the laser cavity with the grating lines must be maintained as the rotor and grating are rotated through the tuning range.

Alignment

If the tuning axis 28 is parallel to the ruled lines of the grating, the non-tuning axis angle will be invariant with tuning angle 25 and no rotation about the non-tuning axis will occur. Typical manufacturing tolerances and economics make this unlikely without specific and sometimes complicated alignment. Proper alignment of the non-tuning axis can be achieved with a simple non-iterative single adjustment by considering the following line of reasoning and FIGS. 3a and 3b. The angle between tuning axis 28 and the grating ruled lines 70 could be broken down into two orthogonal angles $\phi_R$ and $\phi_T$.

Figure 3A:
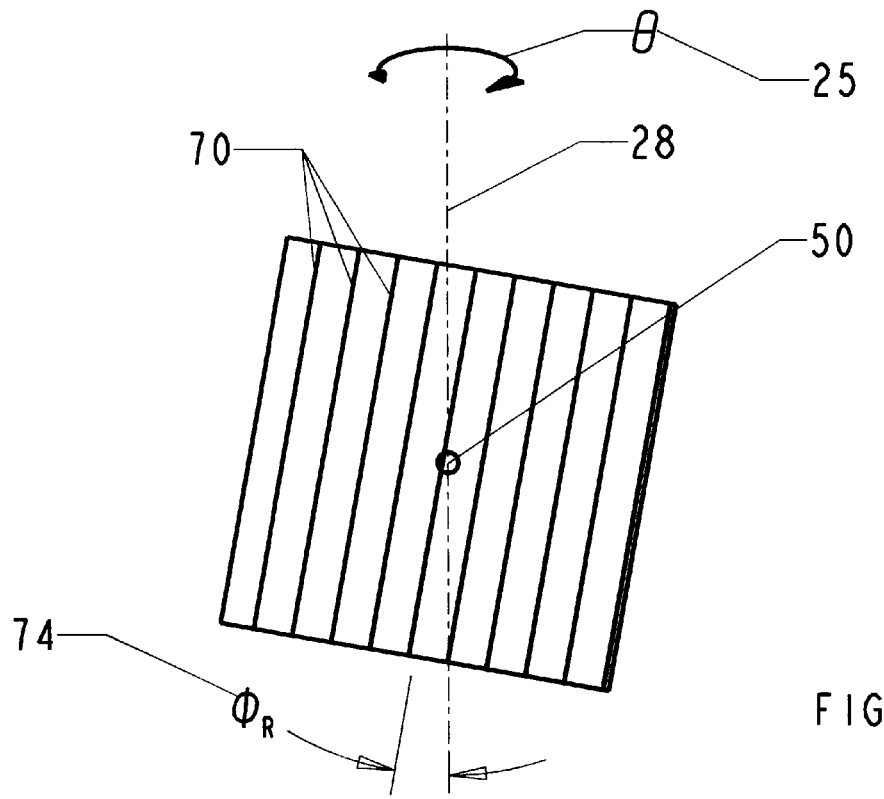
FIG. 3a is a diagram showing a rotational misalignment between the tuning axis and the ruled lines as viewed along the beam axis.

FIG. 3a is a diagram of a grating rotationally misaligned from the direction of the input beam. The angle $\phi_R$74 is defined as the rotational error between axis 28 and ruled lines 70 as viewed along said input beam 50. The input beam 50 is perpendicular to grating lines 70 at a value of θ defined as $\phi_C$, preferably at the tuning range center. As the grating rotates about the tuning angle θ, the non-tuning axis perpendicularity error angle ε follows the sinusoid:

$$\epsilon = \phi_R \sin(\theta - \theta_C)$$

This function, for an angular misalignment error $\phi_R$ of 4000 μradians, has a value of +350 μradians for +5 degrees rotation from $\theta_C$ and −350 μradians for −5 degrees rotation from $\theta_C$. Peak to peak error is 700 μradians over a typically useful angular tuning range of 10 degrees. Viewed differently, adjustment to reduce $\phi_R$ to 230 μradians is necessary for an acceptable non-tuning axis peak error of 20 μradians.

Figure 3B:
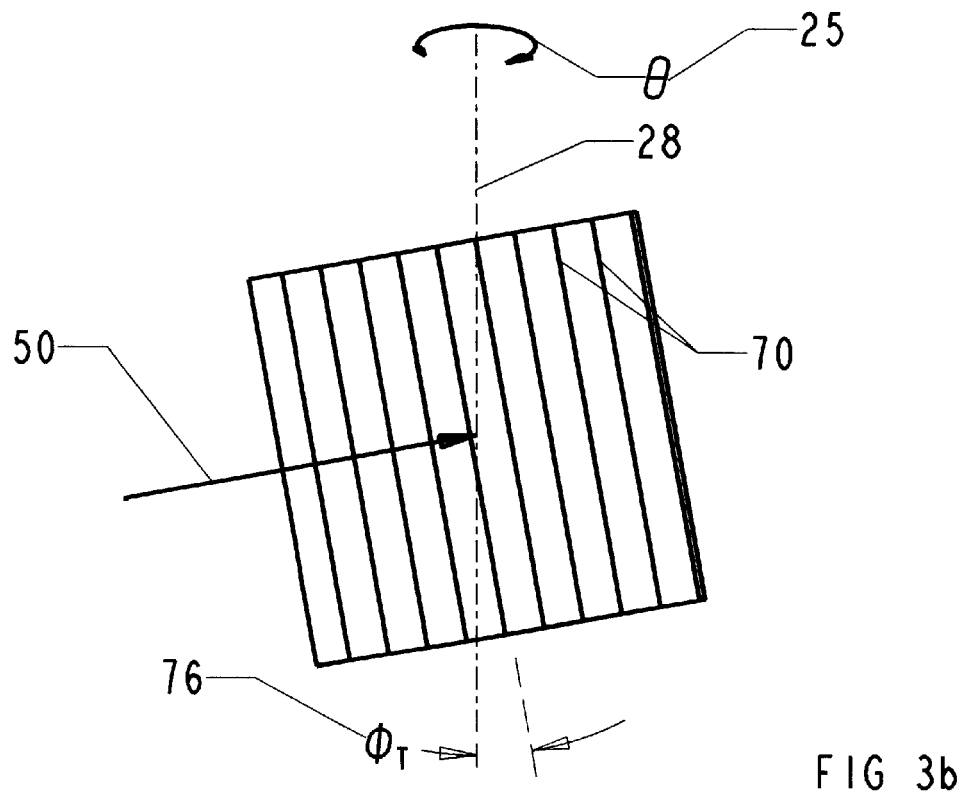
FIG. 3b is a diagram showing a tilt misalignment between the tuning axis and the ruled lines as viewed perpendicular to the beam and tuning axes.

FIG. 3b is a diagram of a grating misaligned in tilt from the direction of the input beam. The angle $\phi_T$76 is the tilt error between axis 28 and ruled lines 70 as viewed perpendicular to the input beam axis 50 and the tuning axis 28. The angles $\phi_R$ and $\phi_T$ are orthogonal to each other and therefore constitute two independent components making up the totality of the angular error between the tuning axis and the grating lines. In FIG. 3b, the input beam 50 is perpendicular to ruled lines 70 at the tuning angle $\theta_C$. As the tuning angle θ rotates, the non-tuning axis perpendicularity error angle ε follows the sinusoid:

$$\epsilon = \phi_T(1 - \cos(\theta - \theta_C))$$

This function, for an angular misalignment error $\phi_T$ of 4000 μradians, has a value of +15 μradians for +5 degrees rotation from $\theta_C$ and also for −5 degrees rotation from $\theta_C$. Peak to peak error is 15 μradians over the same angular tuning range of 10 degrees. Viewed differently, a value for the tilt angle $\phi_T$ of 10500μ radians is acceptable for a non-tuning axis peak error of 20 μradians. No adjustment for the tilt error would be necessary for the same $\phi_T$ of 4000 μradians. It is obvious that although the sine function for the non-tuning axis perpendicularity error ε caused by angles $\phi_R$ and $\phi_T$ have the same nominal amplitude and shape, the tuning range is located at the peak with small first derivative for $\phi_T$ while at the maximum first derivative for $\phi_R$.

The foregoing example shows that satisfactory alignment can be achieved by adjusting for $\phi_R$ alone and accepting reasonable manufacturing errors on tilt $\phi_T$. For the configuration shown in FIG. 2a where the grating adjustment axis 31 is not parallel to the input beam 36, some cross coupling between $\phi_R$ and $\phi_T$ will occur as the necessary adjustment of $\phi_R$ is performed. In the example above, even doubling the value of the tilt while adjusting the rotational misalignment is still acceptable because of the greatly reduced sensitivity to the tilt misalignment.

Figure 2B:
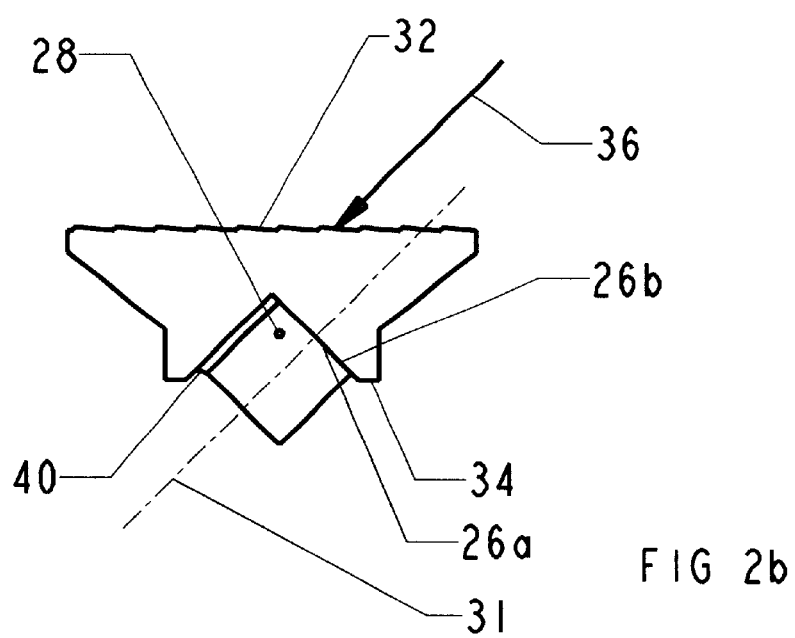
FIG. 2b is a diagram of a cross-section of the rotor and grating of a modified embodiment with the components in contact and having an adjustment plane at substantially the mid tuning band incidence angle.

FIG. 2b is a diagram of a modification of the first embodiment whereby the perpendicular of the grating adjustment plane 26b is nominally set to the input beam 36 incidence angle for an angle within the tuning range, preferably at its center. In this case the grating adjustment axis 31 is substantially parallel to the input beam axis 36 and the $\phi_R$74 adjustment cross coupling into the tilt angular error $\phi_T$76 is nominally zero.

Alignment Mechanism

The adjustment mechanism is preferably removed after alignment for reduction of inertial moment, simplification of balance, improved robustness and other reasons. Additionally, because it is not a part of the rotating assembly, the design of the alignment mechanism can be satisfied by a variety of designs. One such design satisfying the adjustment requirements is depicted in FIG. 4. Grating 27 is held with light pressure against shaft 22 by preload clamps 100 and screws 102 thereby mating the rotor adjustment plane 26a and grating adjustment plane 26b of FIG. 1 and allowing restricted rotation of grating 27. Adjustment base 104 is firmly attached to the opposing side of shaft 22 by screws 106. Counter opposing screws 108a and 108b in tapped holes of adjustment base 104 contact grating 27 on opposite sides and at a first end of said grating. Under low friction loading, coordinated tightening and loosening of screws 108a and 108b accurately and with high resolution, move the first end of the grating relative to shaft 22 thereby rotating grating lines 70 relative to axis 28 as required. Preferably, screws 110a and 110b perform a complimentary function at a second end of grating 27. Preload clamps 100 and adjustment base 104 are preferably removed after alignment and bonding.

Figure 5:
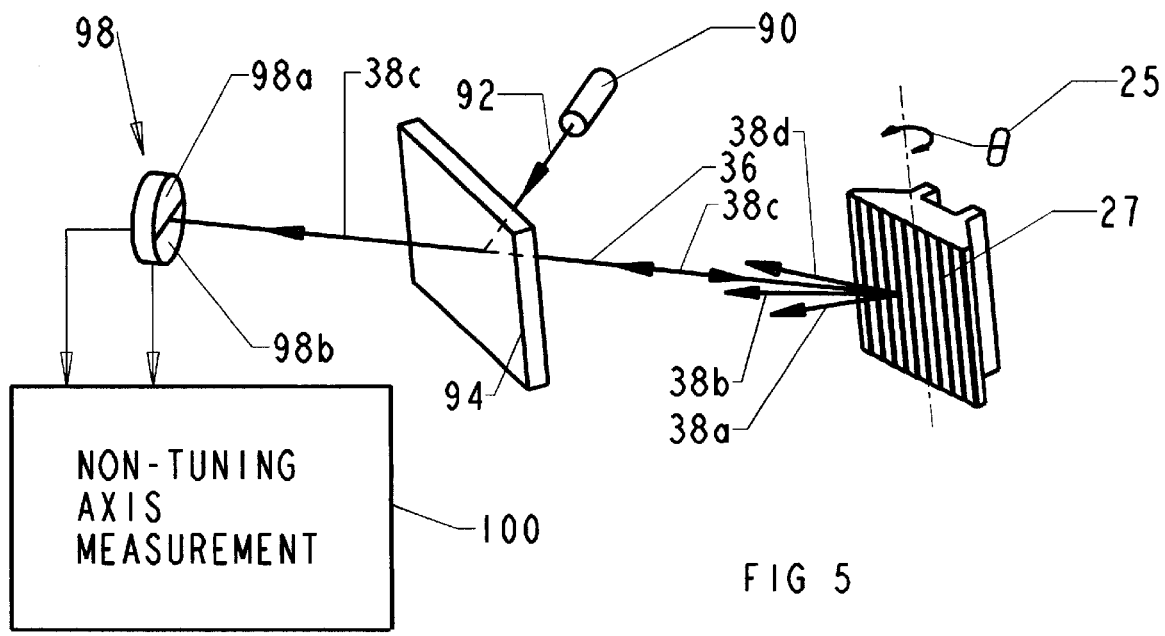
FIG. 5 is an optical layout of an alignment scheme suitable for the alignment of the preferred embodiment.

FIG. 5 is a schematic of an alignment setup suitable for grating adjustment. Many other methods are practical. Alignment laser 90 of a convenient wavelength, outputs beam 92 toward partial mirror 94 and is reflected towards grating 27 under test as beam 36. Reflected order beams typically 38a, 38b, 38c and 38d, responsive along the tuning and non-tuning axes as previously described, pass to the plane of dual detector 98. Non-tuning axis measurement 100 interprets the non-tuning axis position information from upper cell 98a and lower cell 98b producing a net position value in a conventional way. At particular angles of tuning angle θ25, one of the reflective order beams will fall on dual cell detector 98 for non-tuning axis measurement, beam 38c in the example of FIG. 5.

Alignment laser wavelength λ is preferably selected for producing a pair of reflective orders centered within the tuning range.

In operation, an alignment procedure could proceed as follows. Two non-tuning position values are collected from said pair of reflective orders. Non-tuning axis measurement value $V_L$ is collected at a lower tuning angle $\theta_L$ for a lower reflective order and a value $V_H$ at a higher tuning angle $\theta_H$ for a higher reflective order. An extrapolation from these two values to a final value is possible. Note that at a particular tuning angle θ, the grating adjustment axis 31 will become parallel to the input beam axis 36. At that θ, a reflected beam is invariant with adjustment angle $\phi_R$ about axis 31. Defining said θ as $\theta_{INV}$, an extrapolating calculation for the final value $V_F$ can be made approximately as:

$$V_F = V_H(\theta_{INV} - \theta_L) + V_L(\theta_H - \theta_{INV})/(\theta_H - \theta_L)$$

Then, using either tuning angle $\theta_H$ or $\theta_L$, the grating is rotated until the measurement 100 is the value $V_F$ from the above formula. The measurement and grating rotate cycle can be repeated if sufficient accuracy is not achieved.

Grating Matrix

Figure 6:
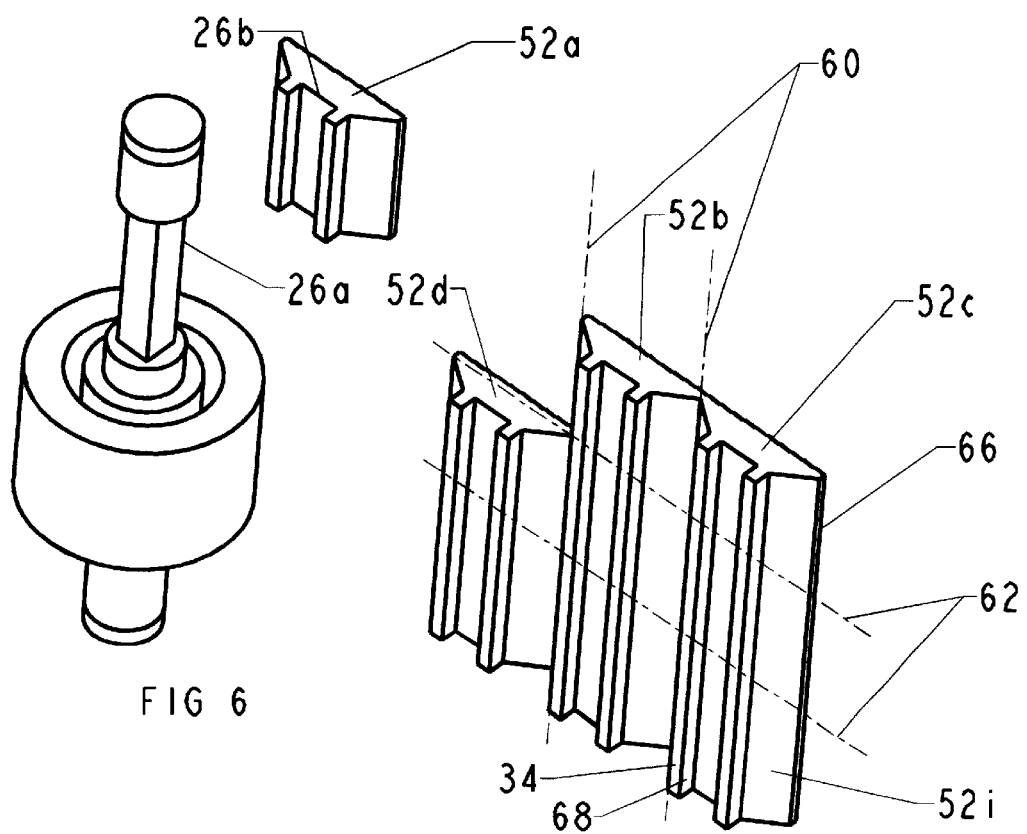
FIG. 6 is a diagram of the preferred embodiment of the present invention showing a separated rotor and a grating as a component of a matrix of gratings.

The simple machining cuts required for the disclosed grating blank format result in lower cost, higher inherent accuracies and easier alignment. Additionally the economics of ruling engines involve, among other things, the length of individual lines, the rate that the line is traversed, the engine retrace time and the blank setup time. The grating as disclosed can result in further reduced costs by fabricating and ruling a matrix of blanks as a single assembly. An example of such an assembly is shown in FIG. 6 where a matrix of nine gratings is depicted. Gratings 52a through 52i are fabricated as a single blank, enabled by the fact that the front surface to be ruled and the mounting plane on the opposing side have a constant and easily machined cross-section.

To minimize the alignment function, the ruled lines on one side of the blank must match the mechanical structures on the opposing side. Fortunately, machining methods produce good parallelism between edge 66 and the side 68 of thermal ridges 34 used typically as a grating mounting constraint. Aligning the ruling engine on edge 66 from the grating side of the blank completes the parallelism requirement. After ruling, cuts 60 and 62 separate individual gratings.

Conclusion, Ramifications and Scope of the Invention

As has been disclosed, this invention enables the operation of agile laser tuners at higher speeds and at higher power. Lower costs have been achieved with simpler alignment and grating fabrication techniques more compatible with ruling engines. The invention enables the use of a wider range of grating blank materials making tuner designs less dependent on denser, expensive and incompatible ones.

It is understood that the invention is not confined to the particular embodiments set forth herein as illustrated, but embraces such modified forms thereof as come within the scope of the following claims as would be obvious to those skilled in the art to which the present invention pertains. Mechanical and optical configurations have been shown in simplified form to present ideas; curved gratings and other mechanical alternatives would similarly fall within the scope of this invention. Simplified equations have been disclosed, but improved equations or finite element analysis techniques would also fall within the scope of this invention.

Although variations have been described, other and in some cases less desirable variations, would fall within the spirit and intent of this disclosure. For example:

(1) The rotary grating could be used in a non-Littrow laser configuration or other optical equipment.

(2) Various angles could be used between the grating adjust plane 26b and the optical surface 32 for mechanical or optical alignment reasons.

(3) While a removable grating adjustor is preferable, a non-removable one would fall within the scope of the invention.

(4) Gratings could be fabricated individually and could have holes or tapped holes.

(5) Other alignment methods and setups could be used.

(6) Thermal ridges reduce temperature gradients and improve alignment by restricting grating movement but could be eliminated.

(7) Other shapes around the adjustment interface could be used to enhance balance or minimize moment of inertia.

(8) Bearings, flexures, actuators and grating mounting areas can lie along the shaft in any order.

Accordingly, the scope of the invention should be determined not by the embodiments illustrated, but by the appended claims and their legal equivalents.

I claim:

1. A method of constructing a rotary grating means for utilizing a variety of grating blank materials and for maintaining a non-tuning axis alignment over a substantial range of a tuning angle comprising the steps of:

provideing a shaft supported by one or a plurality of pivots defining a tuning axis;

providing a rotor adjustment plane on said shaft substantially parallel to said tuning axis;

providing a grating having a set of ruled lines on a first surface and having a grating adjustment plane at a predetermined angle to said first surface and substantially parallel to the ruled lines;

preloading said rotor adjustment plane and said grating adjustment plane in sliding contact whereby said grating is rotatable about a grating adjustment axis perpendicular to the adjustment planes;

supplying an input beam having an input beam angle and supplying a plurality of tuning angles to said grating;

monitoring a plurality of output beam angles relative to said non-tuning axis alignment and relative to the input beam angle;

rotating said grating about said grating adjustment axis to bring said tuning axis, the input beam angle and a line parallel to the ruled lines substantially into a coplanar state at a central location in the range of tuning angles whereby the grating lines as viewed from a source of the input beam are substantially parallel to the tuning axis and said input beam remains substantially perpendicular to said ruled lines over a substantial range of said tuning angles;

bonding said grating adjustment plane to said rotor adjustment plane.

2. The method of constructing a rotary grating means as recited in claim 1 wherein said step of rotating said grating further comprises the steps of:

measuring a first non-tuning axis output beam angle responsive to a wavelength, to a first retro-reflection and to a first tuning angle;

measuring a second non-tuning axis output beam angle responsive to said wavelength, to a second retro-reflection and to a second tuning angle;

predicting an ideal non-tuning axis output beam angle by extrapolating from the first and second non-tuning axis output beam angle measurements and a non-tuning axis invariant tuning angle;

adjusting a one or an other of the first and second non-tuning axis output beam angle to said ideal non-tuning axis output beam angle;

repeating the steps of measuring a first and second, predicting and adjusting until a difference between the first and second output beam angle is substantially zero.

3. The method of constructing a rotary grating means as recited in claim 1 wherein said step of monitoring further comprises the step of:

providing a permanent rotor mounted adjusting mechanism for said grating adjustment axis.

4. The method of constructing a rotary grating means as recited in claim 1 wherein said grating in the step of providing a grating comprises a curved grating.

5. The method of constructing a rotary grating means as recited in claim 1 wherein said predetermined angle of said grating adjustment plane is equal to zero.

6. The method of constructing a rotary grating means as recited in claim 5 wherein said one or a plurality of pivots includes one or a plurality of flexural pivots.

7. The method of constructing a rotary grating means as recited in claim 1 wherein said predetermined angle of said grating adjustment plane is equal to said input beam angle at an angle within the range of a tuning angle.

8. The method of constructing a rotary grating means as recited in claim 1 further comprising the step of:
providing a laser cavity whereby said rotary grating means comprises a tuned laser.

9. The method of constructing a rotary grating means as recited in claim 6 wherein said step of providing a rotor adjustment plane further comprises the step of:
providing one or a plurality of bonding planes on said shaft substantially parallel to said tuning axis;
and wherein said step of providing a grating further comprises the step of:
providing a one or a plurality of thermal ridges on said grating, positioned closely adjacent to said bonding planes whereby sufficient space for grating adjustment is available.

10. The method of constructing a rotary grating means as recited in claim 9 wherein said grating in the step of providing a grating comprises a grating fabricated and ruled as a one in a matrix of gratings.

11. A rotary grating means responsive to a tuning angle and an input beam angle and operative to maintain a substantially constant non-tuning axis angle over a significant range of the tuning angle comprising:
rotor means including a shaft, one or a plurality of pivots, an actuator and a rotor adjustment plane and operative for defining a tuning axis, for positioning said rotor adjustment plane at a one or a plurality of angles within a range of tuning angles and for providing mounting and adjustment for a grating means;
grating means including a first surface comprised of a set of parallel ruled lines and an oppositely located grating adjustment plane at a predetermined angle relative to said first surface and operative for receiving an input beam, for reflecting an output beam, for placement of said rotor adjustment plane in parallel and in close proximity to the grating adjustment plane, for adjustment about a perpendicular to said grating adjustment plane at a plurality of tuning angles and for locating said tuning axis, said input beam and a line parallel to the ruled lines in substantially the same plane whereby said input beam remains substantially perpendicular to said ruled lines over the significant range of angles of said tuning axis;
bonding means operative for providing a mechanical connection between the rotor and grating adjustment planes and for providing a thermal connection between said rotor and grating adjustment planes.

12. A rotary grating means as recited in claim 11 wherein said grating means includes:
a beam detector means responsive to a wavelength, a first and second retro-reflection and a first and second tuning angle and operative for measuring a first and second non-tuning axis output beam angle and for predicting an ideal non-tuning axis output beam angle by extrapolating from the first and second non-tuning axis output beam angle and a non-tuning axis invariant tuning angle;
a beam adjustment means responsive to the predicted ideal non-tuning axis output beam angle for adjusting said grating and for reducing the difference between said first and second non-tuning axis output beam angle.

13. A rotary grating means as recited in claim 11 wherein said grating means includes a permanent rotor mounted adjusting mechanism and operative for adjustment about said perpendicular to said grating adjustment plane.

14. A rotary grating means as recited in claim 11 wherein said first surface is a curved surface.

15. A rotary grating means as recited in claim 11 wherein said predetermined angle of said grating adjustment plane is equal to zero.

16. A rotary grating means as recited in claim 15 and wherein said rotor means further includes one or a plurality of bonding planes substantially parallel to said tuning axis;
and wherein said grating means further includes a one or a plurality of thermal ridges on said grating, positioned closely adjacent to said bonding planes whereby sufficient space for grating adjustment is available.

17. A rotary grating means as recited in claim 11 further comprising a laser cavity wherein said rotary grating means comprises a tuned laser.

18. A rotary grating means as recited in claim 11 wherein said one or a plurality of pivots includes one or a plurality of flexural pivots.

19. A rotary grating means as recited in claim 18 wherein said predetermined angle relative to said first surface is equal to an angle of the input beam within the range of a tuning angle.

20. A rotary grating means as recited in claim 19 wherein said grating comprises a grating fabricated and ruled as a one in a matrix of gratings.

* * * * *